United States Patent [19]
Ogawa

[11] Patent Number: 5,896,366
[45] Date of Patent: Apr. 20, 1999

[54] OPTICAL RECORDING MEDIUM HAVING A PLURALITY OF RECORDED PITS OF DIFFERENT HEIGHTS AND DEPTHS

[75] Inventor: Masatsugu Ogawa, Tokyo, Japan

[73] Assignee: NEC Corporation, Tokyo, Japan

[21] Appl. No.: 08/800,396

[22] Filed: Feb. 14, 1997

[30] Foreign Application Priority Data

Feb. 16, 1996 [JP] Japan .................................. 8-029669

[51] Int. Cl.$^6$ .................................................. G11B 7/24
[52] U.S. Cl. ............................... 369/275.4; 369/275.1
[58] Field of Search ........................... 369/275.4, 275.1, 369/275.2, 58, 277, 280, 281

[56] References Cited

U.S. PATENT DOCUMENTS

| | | | |
|---|---|---|---|
| 5,559,787 | 9/1996 | Nomoto | 369/275.4 |
| 5,572,508 | 11/1996 | Satoh et al. | 369/275.4 |
| 5,602,824 | 2/1997 | Ooki et al. | 369/275.4 |
| 5,602,825 | 2/1997 | Sugaya et al. | 369/275.4 |
| 5,623,478 | 4/1997 | Horimai | 369/275.4 |
| 5,724,339 | 3/1998 | Ogawa | 369/275.4 |

FOREIGN PATENT DOCUMENTS

| | | |
|---|---|---|
| 2-172039 | 7/1990 | Japan . |
| 5-128530 | 5/1993 | Japan . |
| 6-139647 | 5/1994 | Japan . |
| 7-021569 | 1/1995 | Japan . |

*Primary Examiner*—Tan Dinh
*Attorney, Agent, or Firm*—Foley & Lardner

[57] ABSTRACT

A method is provided for achieving high density in an optical playback medium, without relying on a reduction in size of a recorded feature. In this method, the optical playback medium has a substrate that has a substrate surface, a magnetic film formed on that substrate surface and having a magnetic film surface, and has a plurality of recording pits which are formed on either the substrate surface or on the magnetic film surface, these pits being depressions and protrusions.

28 Claims, 9 Drawing Sheets

CROSS SECTION a-a

CROSS SECTION a-a

CROSS SECTION b-b

Width of land or groove, X (nm)

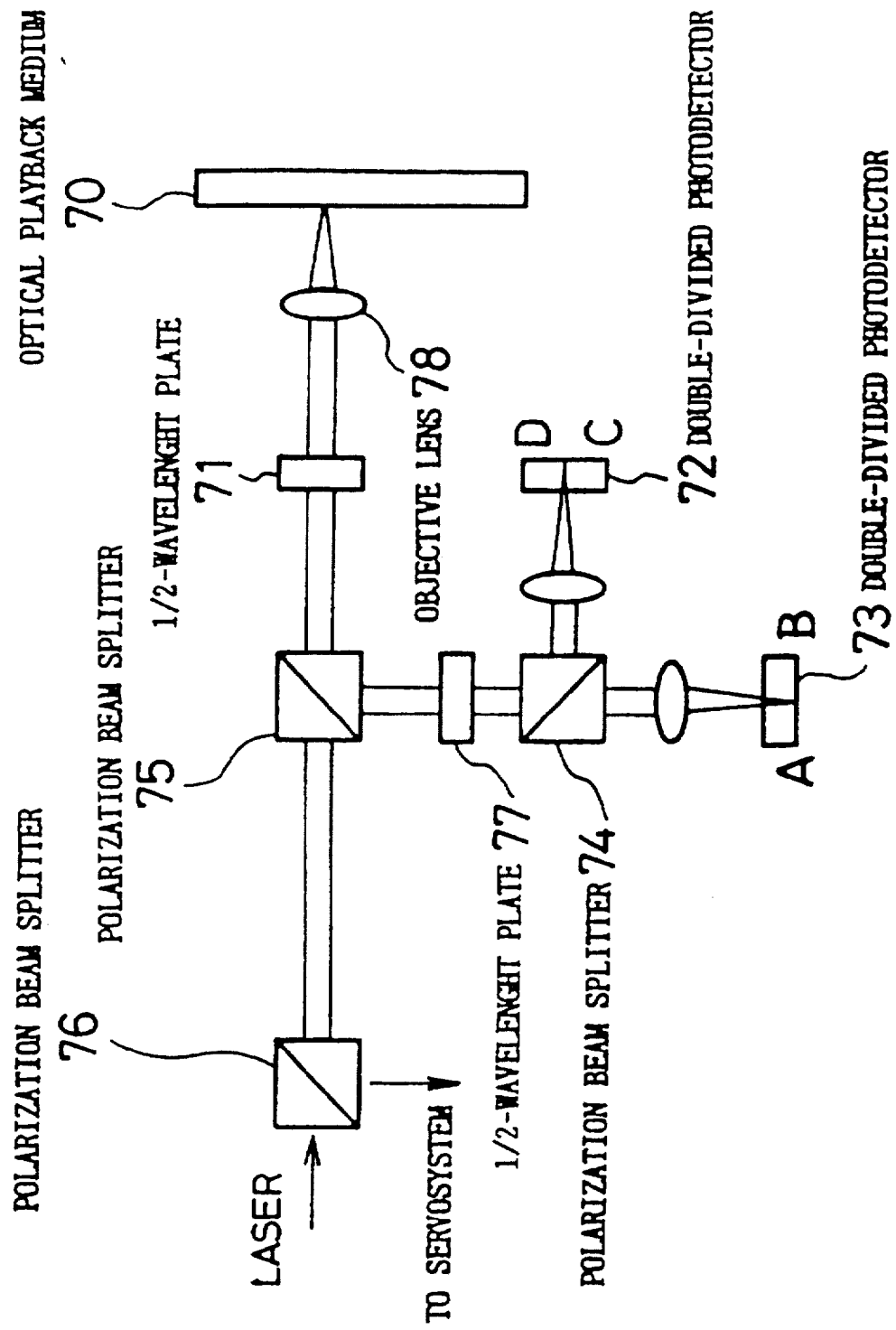

CROSS SECTION a-a

5,896,366

OPTICAL RECORDING MEDIUM HAVING A PLURALITY OF RECORDED PITS OF DIFFERENT HEIGHTS AND DEPTHS

BACKGROUND OF THE INVENTION

1. Field of the Invention

The present invention relates to an optical playback medium and a playback method therefor.

2. Description of the Related Art

An optical playback medium is typically an optical disk, an optical card, or a similar medium. At present, there are active efforts underway to achieve high density in CD-ROMs (Compact Disc Read-Only Memories), which are playback-only optical disks. Bumps and depressions are formed in the surface of a CD-ROM substrate and a difference of intensity of light reflected from the surface when light is caused to strike the surface are sensed to recognize these surface bumps and depressions and convert them to a signal.

Referring to FIGS. 8(A) and 8(B), in an optical playback medium of the past (CD-ROM), a recorded original, known as a stamper, having bumps and depressions, is transferred to a substrate 2, which is fabricated by means of injection molding technology or the like, and a metallic film such as aluminum is formed on the top of this substrate 2 as a reflective film 4. The stamper is made by an exposure technique known as mastering, a recorded mark formed in the stamper by mastering becoming a recorded pit 3 that is a groove in the optical playback medium (CD-ROM). When doing this, the density of the recording pits 3 of the optical playback medium (CD-ROM) is established by how small a recording mark can be formed in the stamper by mastering.

However, with the recent demand for high-density, mastering is reaching a limit, which is blocking the achievement of higher-density optical media (CDROMs). To achieve high density in an optical playback medium (CD-ROM), it is necessary to have a new method that does not rely on mastering alone.

SUMMARY OF THE INVENTION

The present invention was conceived to avoid the above-noted limitation, and has as an object to provide an optical playback medium that enables further increases in density without relying of on mastering alone.

Another object of the present invention is to provide a playback method for an optical playback medium that enables further increases in density without relying of on mastering alone.

According to the present invention, an optical playback medium is provided which has a substrate with a substrate surface, a magnetic film which is formed onto a surface of the substrate and which has a magnetic film surface, and a plurality of recording pits which are formed on one of the substrate surface and the magnetic film surface, each recording pit having a length component along a tracking direction of the optical playback medium, a width component that is perpendicular to the tracking direction, and a perpendicular shape component that is perpendicular to the substrate surface, a part of a plurality of the recording pits have configurations different from that of the rest of the plurality of recording pits with respect to the perpendicular shape component.

In addition to the configuration of these recording pits, according to the present invention, an optical playback medium is provided wherein the above-noted plurality of recording pits has a plurality of types of shapes, between which the above-noted widths are further mutually different from to each other.

Namely, according to the present invention, the most characteristic technical feature of the present invention is that an optical playback medium is provided wherein the above-noted plurality of recording pits has a plurality of types of shapes, between which only the above-noted perpendicular shape components mutually differ.

According to the present invention, an optical playback medium is provided wherein the above-noted plurality of recording pits have grooves and lands as the above-noted perpendicular shape components.

According to the present invention, an optical playback medium is provided which has a substrate with a substrate surface, a magnetic film which is formed onto this substrate surface and which has a magnetic film surface, and a plurality of recording pits that are formed on either the above-noted substrate surface or above-noted magnetic film surface, wherein there exist recording pits having a plurality of shape types which, in addition to modulation of the length in the tracking direction of the above-noted optical playback medium, are formed as grooves and lands with respect to the above-noted substrate surface or above-noted magnetic film surface.

According to the present invention, an optical playback medium is provided which has a substrate with a substrate surface, a light-reflecting film which is formed with substrate surface, and a plurality of recording pits that are formed on the above-noted substrate surface, the above-noted plurality of recording pits being deviated to the left or to the right of an axis that is parallel to the tracking direction of the above-noted optical playback medium and which passes through the center of tracking of the above-noted optical playback medium.

According to the present invention, an optical playback medium is provided which has a substrate with a substrate surface, a magnetic film which is formed onto this substrate surface and which has a magnetic film surface, and a plurality of recording pits that are formed on either the above-noted substrate surface or above-noted magnetic film surface, the above-noted plurality of recording pits being deviated to the left or to the right of an axis that is parallel to the tracking direction of the above-noted optical playback medium and which passes through the center of tracking of the above-noted optical playback medium.

This kind of recording pits may include the pits in that a center axis of a longitudinal direction of the pits and parallel to the center line of the tracking direction, is deviated by a certain length.

According to the present invention, an optical playback medium is provided which has a substrate with a substrate surface, a magnetic film which is formed onto this substrate surface and which has a magnetic film surface, and a plurality of recording pits that are formed on either the above-noted substrate surface or above-noted magnetic film surface, wherein each of the adjacent recording pits in a direction that is perpendicular to the tracking direction of the above-noted optical playback medium has a different direction of the perpendicular shape component, to each other, so that one bumped recording pits is deviated adjacent to depressed recording pits which is arranged in a direction perpendicular to the tracking direction.

According to the present invention, a playback method is provided whereby, with respect to the above-noted optical playback medium, light which is polarized in a direction parallel to the tracking direction of the optical playback medium or light which is perpendicular to the above-noted tracking direction are used to perform playback.

According to the present invention, a playback method is provided whereby, with respect to the above-noted optical playback medium, circularly polarized light and elliptically polarized light are used to perform playback.

According to the present invention, a playback method is provided wherein, with respect to the above-noted optical playback medium, the directions of polarization of playback light of adjacent recording pits which are perpendicular to the tracking direction of the above-noted optical playback medium are mutually perpendicular.

According to the present invention, a playback method is provided wherein, with respect to the above-noted optical playback medium, the polarization directions of the playback light used are a polarization direction that is parallel to the tracking direction of the optical playback medium and a polarization direction that is perpendicular to the tracking direction of the optical playback medium.

According to the present invention, a playback method is provided wherein, seen from the playback light side of incidence, with respect to a depressed recording pit on the above-noted substrate surface or above-noted magnetic film surface, playback is performed by light having a polarization direction that is perpendicular to the tracking direction and, with respect to a raised recording pit, playback is performed by light having a polarization direction that is parallel to the tracking direction.

According to the present invention, a playback method is provided wherein, with respect to the above-noted optical playback medium, playback is performed by using two or more photodetectors in a direction that is parallel to the tracking direction of the above-noted optical playback medium.

Furthermore, according to the present invention, a playback method is provided, wherein playback is performed by taking the difference between the sum of the output to one side of an axis that is parallel to the tracking direction and the sum of the output to the other side of the axis and by taking the sum of both outputs.

According to the present invention, a playback method is provided which has an optical system that separates light from an optical playback medium into light of a polarization direction (TE polarized light) that is parallel to the tracking direction and light of a polarization direction (TM polarized light) that is perpendicular to the tracking direction, immediately before impinging on a photodetector, wherein the photodetector that detects each component is divided into two by an axis that is parallel to the tracking direction and which passes through the center thereof, the output A being on the center side of the optical playback medium with respect to the above-noted axis of the detector that detects the above-noted TE polarized light, the output B being on the opposite side thereof, the output C being on the center side of the optical playback medium with respect to the above-noted axis of the detector that detects the above-noted TM polarized light, the output D being on the opposite side thereof, (A+B)−(C+D), (A+C)−(B+D), and A+B+C+D being used as playback signals.

BRIEF DESCRIPTION OF THE DRAWINGS

FIG. 7 is a simplified drawing which shows the optical system of the optical playback medium shown in FIG. 1 through FIG. 5.

DESCRIPTION OF THE PREFERRED EMBODIMENTS

Embodiments of the present invention will be described below, with reference being made to the relevant accompanying drawings.

Figure 1A:
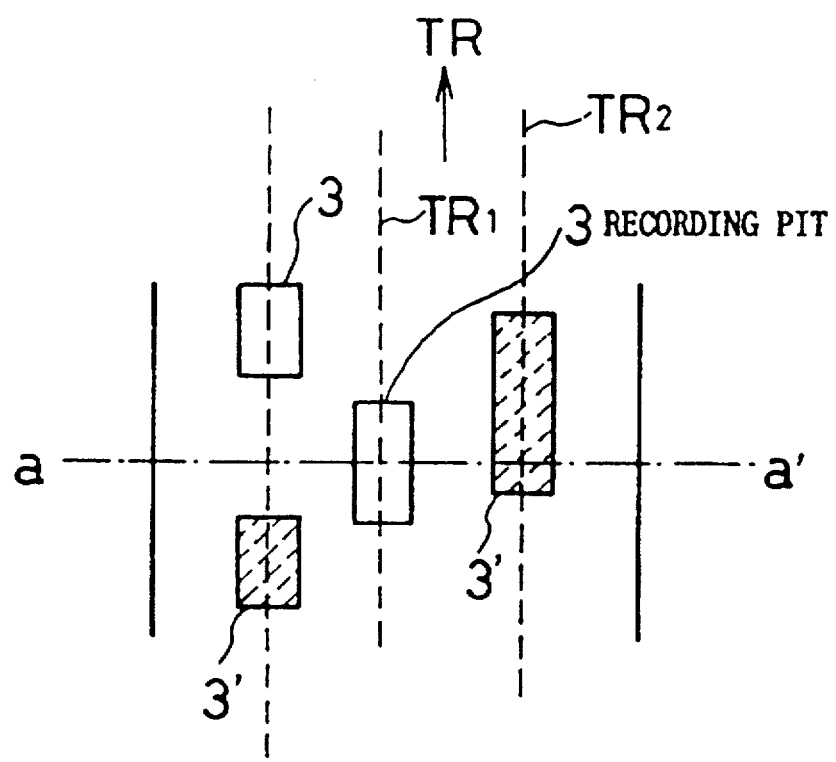
FIGS. 1(A) and 1(B) are simplified drawings which show the first embodiment of an optical playback medium according to the present invention.
Figure 1B:
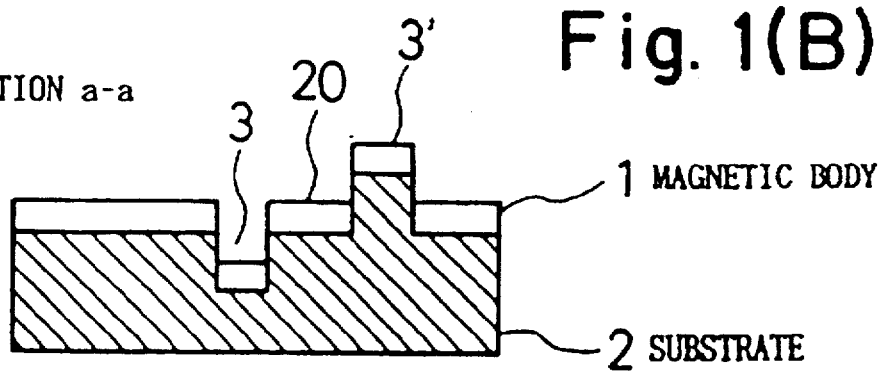

FIG. 1 shows the first embodiment of an optical playback medium according to the present invention. FIG. 1(A) shows a plan view, and FIG. 1(B) shows a cross-sectional view thereof, taking from a—a' line.

Figure 8A:
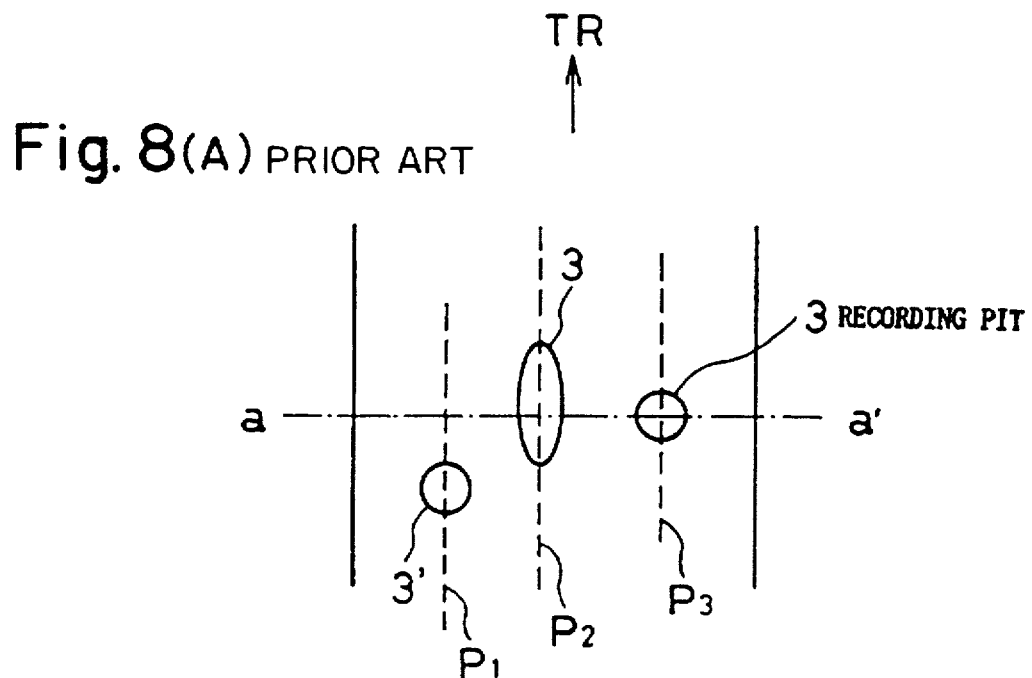
FIGS. 8(A) and 8(B) are simplified drawings which show an optical playback medium of the past.
Figure 8B:
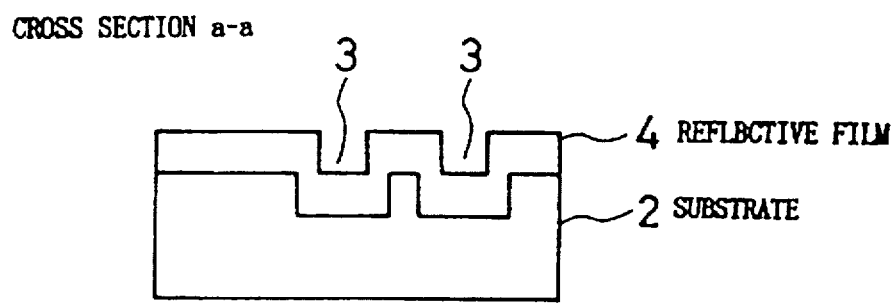

In the plan view of FIG. 1(A), the cross-hatched areas are recording pits 3' that are protruding areas (lands), and a frame without hatching shows a depressed area such as the recording pits 3 (groove), this convention being followed in subsequent drawings as well. This optical playback medium basically has a substrate 2 and a magnetic body (magnetic film) 1 which is formed on the substrate 2. As is clear from a comparison with the optical playback medium (CD-ROM) of the past which is shown in FIG. 8, it can be seen that there is a large difference, in that optical playback medium shown in FIG. 1 has formed on it a magnetic body (magnetic film) 1, and in the existence of recording pits 3 which are depressions (grooves) and recording pits 3' which are protrusions (lands).

Figure 2A:
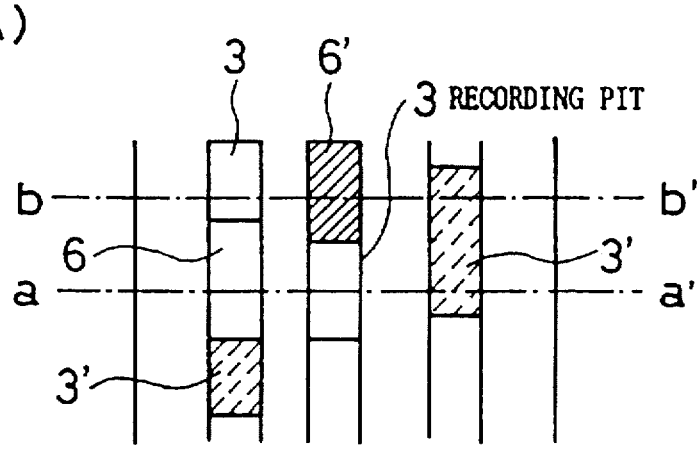
FIGS. 2(A) to 2(C) are simplified drawings which show the second embodiment of an optical playback medium according to the present invention.
Figure 2B:
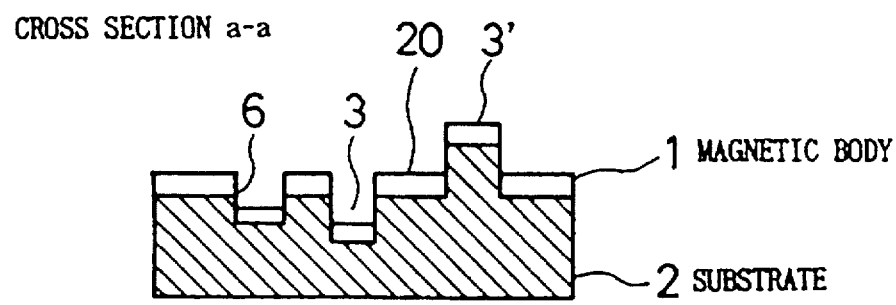
Figure 2C:
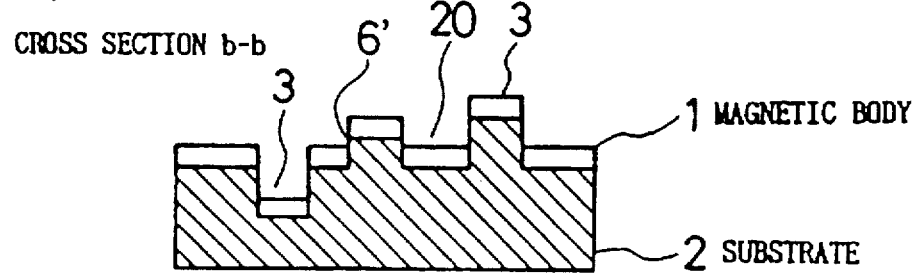

FIGS. 2(A) to 2(C) show the second embodiment of an optical playback medium according to the present invention.

FIG. (A) shows a plan view, and FIGS. 2(B) and 2(C) show a cross-sectional view thereof. As is clear from a comparison of the optical playback medium of FIG. 2 with the optical playback medium (CD-ROM) of the past shown in FIG. 8, it can be seen that there is a large difference, in that the optical playback medium of FIG. 2 has a magnetic body (magnetic film) 1 formed on it, in the existence of recording pits 3 which are depressions (grooves) and recording pits 3' which are protrusions (lands), and in the existence of a pit 6 which is a shallow part depression (shallower than the recording pit 3 which is a depression), and of pit 6' which is a low protrusion (lower than the recording pit 3' which is a protrusion) in a part that was flat in the past, therefore, in this embodiment, at least 4 different kinds of information can be registered.

FIG. 3 shows the third embodiment of an optical playback medium according to the present invention.

Figure 3A:
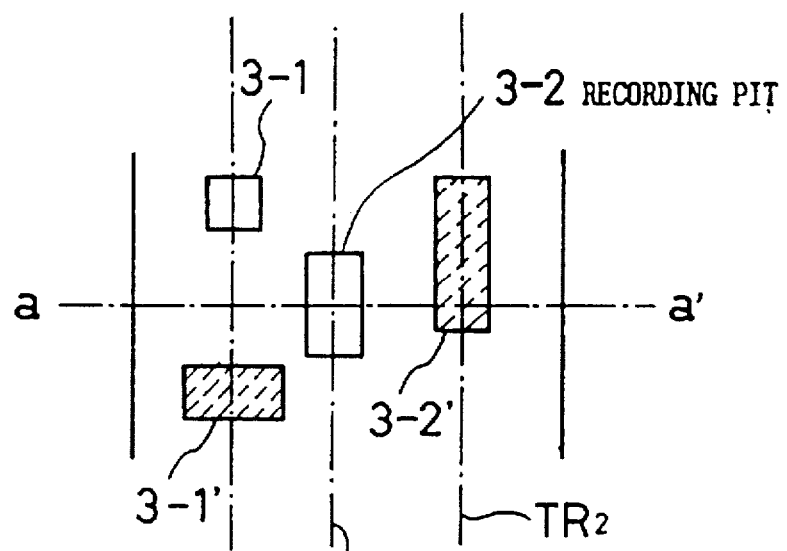
FIGS. 3(A) and 3(B) are simplified drawings which show the third embodiment of an optical playback medium according to the present invention.
Figure 3B:
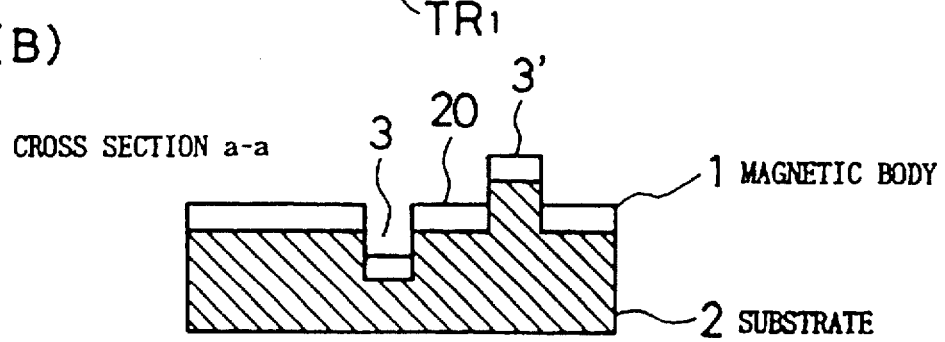

FIG. 3(A) shows a plan view, and FIG. 3(B) shows a cross-sectional view thereof. As is clear from a comparison of the optical playback medium of FIG. 3 with the optical playback medium of the past (CD-ROM) shown in FIG. 8, it can be seen that there is a large difference, in that the optical playback medium of FIG. 3 has a magnetic body (magnetic film) 1 formed on it, and in the existence of a recording pit 3 which is a depression and a recording pit 3' which is a protrusion, and in that, viewed from above, there is a plurality of shapes of recording pits 3, these being square and rectangular.

Further, each of the recording pits has different configuration, respectively, from each other at least in one of the components such as the width component, the length component and the perpendicular shape component.

FIG. 4 shows the fourth embodiment of an optical playback medium according to the present invention.

Figure 4A:
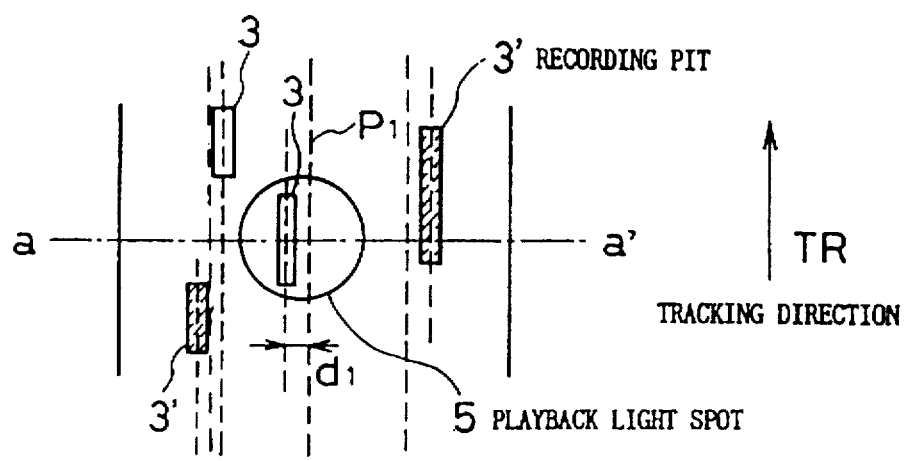
FIGS. 4(A) and 4(B) are simplified drawings which show the fourth embodiment of an optical playback medium according to the present invention.
Figure 4B:
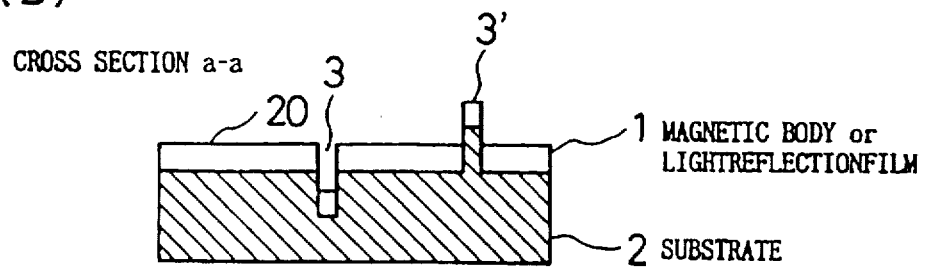

FIG. 4(A) shows a plan view, and FIG. 4(B) shows a cross-sectional view thereof. As is clear from a comparison of the optical playback medium of FIG. 4 with the optical playback medium of the past (CD-ROM) shown in FIG. 8, it can be seen that there is a large difference, in that the optical playback medium of FIG. 4 has a magnetic body (magnetic film) 1 formed on it, in the existence of a recording pit 3 which is a depression and a recording pit 3' which is a protrusion, and in that the recording pit 3 which is a depression and the recording pit 3' which is a protrusion are each offset to the left or to the right of an axis P1 which is parallel to the tracking direction TR and which passes through the center of a playback light spot 5 by a distance d1.

In the optical playback medium of the past which is shown in FIG. 8, each of the recording pits 3 which are depressions are located on an axis which is parallel to the tracking direction and which passes through the center of the playback light spot.

FIG. 5 shows a fifth embodiment of an optical playback medium according to the present invention.

Figure 5A:
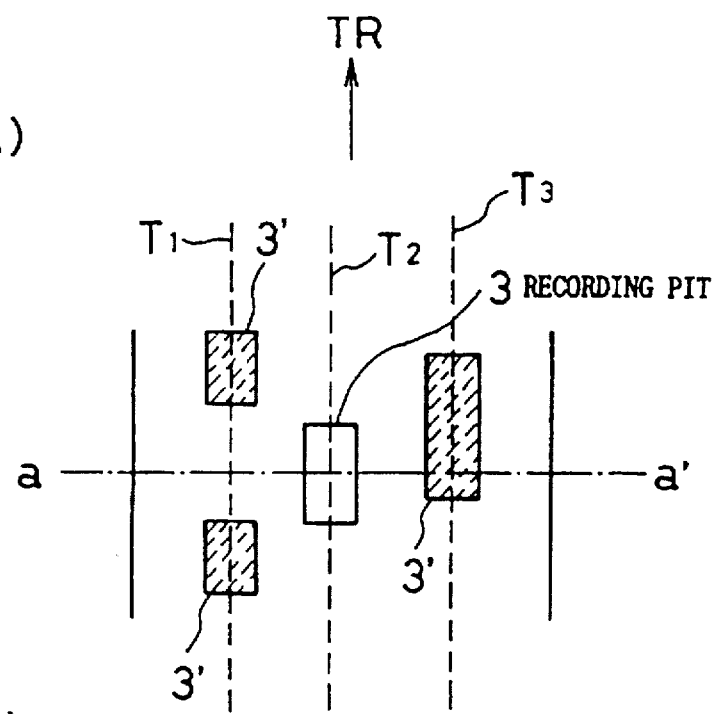
FIGS. 5(A) and 5(B) are simplified drawings which show the fifth embodiment of an optical playback medium according to the present invention.
Figure 5B:
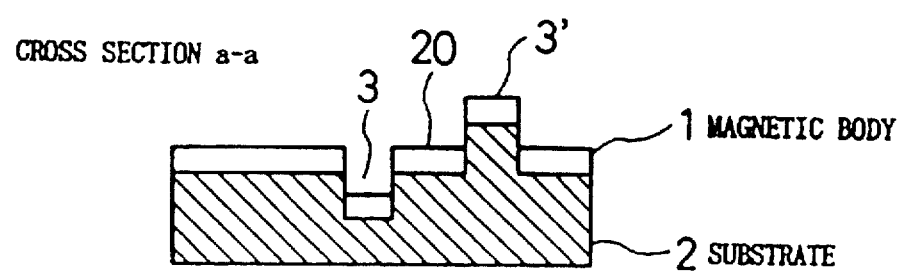

FIG. 5(A) shows a plan view, and FIG. 5(B) shows a cross-sectional view thereof. As is clear from a comparison of the optical playback medium of FIG. 5 the optical playback medium (CD-ROM) of past shown in FIG. 8, it can be seen that there is a large difference in that the optical playback medium of FIG. 5 has a magnetic body (magnetic film) 1 formed on it and in that the existence of a recording pit 3 that is a depression and a recording pit 3' that is a protrusion, in that recording pit 3 which is a depression is formed, for example, on a given track T1 and that on a track T2 adjacent thereto there is a recording pit 3' that is a protrusion (that is, that the recording pits on adjacent tracks are depression-protrusion reversed).

Although in FIG. 1 through FIG. 5 a magnetic body (magnetic film) 1 is form on the substrate 2 which is previously provided with a plurality of recording pits having different configurations from each other, it is also possible to form a film onto the substrate in the sequence of electrolytic film, magnetic film, and then electrolytic film, as in a magneto-optical disk of the past. It is also possible to form a reflective film or the like on top of the electrolyte film above the magnetic film (the electrolyte film the farthest from the substrate). There is no need for the magnetic body to be only one magnetic film layer 1, and it is possible to have a number of layers thereof.

It is possible to use an amorphous alloy of a rare-earth metal and a transition metal, a multilayered construction in that film of a transition metal and a noble metal are layered with a specific manner, a MnBi alloy, or an oxide magnetic body or the like as the magnetic film.

A film having TbFeCo as its principle component is particularly desirable. It is desirable to have one or more anti-corrosiveness enhancing elements such as Ti, Cr, Ni, Ta, Pt or the like in the magnetic film.

It is possible to use a synthetic resin such as a polycarbonate or acrylic or glass as the material for the substrate 2, and also possible to cover these materials with resin or the like. The shape of the substrate 2 is the shape of a disc or a card.

It is further possible to create an optical playback medium by combining two or more embodiments in the above-noted FIG. 1 through FIG. 5.

Figure 6:
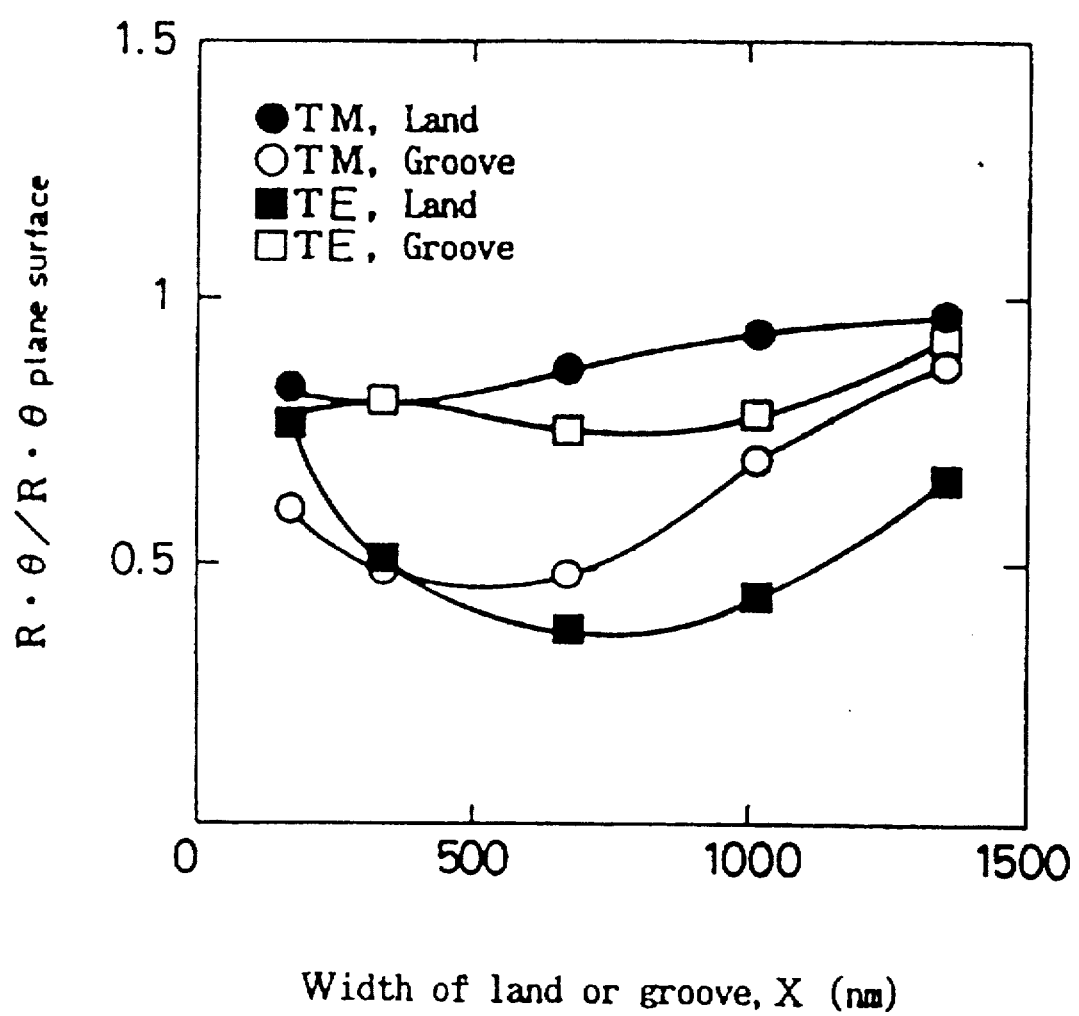
FIG. 6 is a simplified drawing which illustrates the dependency of the product of the scattered light intensity R from a magnetic body having a depression (groove) or a protrusion (land) and the Kerr rotational angle θ on the width of the depression (groove) or a protrusion (land).

FIG. 6 shows the dependency of the product $R \cdot \theta$ of the scattered light intensity R from a magnetic body having grooves or lands and the Kerr rotational angle $\theta$, on the groove width or land width when it is struck by a Gaussian beam of light. The vertical axis in FIG. 6 represents $R \cdot \theta$, which is the above-noted $R \cdot \theta$ product divided (normalized) by the product $R \cdot \theta$ plane surface for the case of a flat plane onto which no pits are formed.

This is for the case of an incident light wavelength of 680 nm, a groove depth or land height of 85 nm, and rectangular grooves and lands. In this specification, the terms groove shape and land shape shall be used as an expression of the cross-sectional shape of a recording pit in the direction that is perpendicular to the tracking direction.

From the drawing, it can be seen that, for TE polarized light (light having a polarization direction which is parallel to the tracking direction), the output is higher for a groove than for a land, and that, for TM polarized light (light having a polarization direction which is perpendicular to the tracking direction), the reverse relationship is obtained.

Therefore, if a magnetic body, i.e., a magnetic film, is formed onto a substrate onto which recording pits have been formed, recording pits are played back by using linear polarization, and the magnitude of $R \cdot \theta$ is discriminated, it is possible to recognize whether the played back pit is a land or a groove. Because the size of R will differ, depending upon whether there is or is not a recording pit, with there being almost no difference in R between a land and a groove, if a magnitude of R is discriminated as in the past, it is possible to perform three-value playback, by including the shape of the recording pit as a parameter.

If lands and grooves are formed on a flat part of the substrate that has no recording pits so that a difference in the reflected light intensity can be generated from the reflected light from a part that has a recording pit, it is possible to map multiple values on flat parts as well, thereby enabling 4-value playback.

For example, it is possible to form, on a part that was flat 20 on which no groove or land have been formed, in the past, shallow grooves or low lands 6, 6', which have a relatively small amount of perpendicular shape component comparing with those of the grooves or lands 3, 3', or lands or grooves having a height or depth that is an integral multiple of a quarter-wavelength (thereby obtaining, by the action of interference, an amount of reflected light that is the same as when flat, or that is extremely small).

In one embodiment of the present invention, the following configuration of the recording pits formed in the optical playback medium can be used, in that at least a part of the recording pits belonging to at least one of the group selected from a group consisting of a plurality of the depressed recording pits and a group consisting of a plurality of the protrudent recording pits, have a pit-configuration in which at least one of the length component parallel to the tracking direction and the width component perpendicular to the tracking direction is different from the same component of the configurations of other recording pits.

And more specifically, the depth or height of each one of the recording pits is set up at from 1/(8n) to 1/(4n) of the wavelength of playback light used in playback from the optical playback medium or set up at a value obtained by adding the value representing from 1/(8n) to 1/(4n) of the wavelength of playback light to the integer number times wavelength of playback light, when a index of reflection of the substrate is set at n.

As shown in FIG. 3, if recording pits are formed so as to appear as squares as seen from above the substrate surface or the magnetic film surface, an output is obtained that is intermediate with respect to the R-θ output of rectangular land and groove recording pits which have a long side in the tracking direction, thereby enabling discrimination of square recording pits 3-1 from other recording pits 3-2.

Therefore, if square recording pits 3-1 are added to the above-noted recording pits, it is possible to perform playback of a further increased number values.

Since, as shown in FIG. 6, R-θ exhibits a dependency on the width of a groove or land, by using land and groove shaped recording pits that are rectangular with a long side perpendicular to the tracking direction, as shown, for example, the recording pits 3-1, 3-2, in FIG. 3, it is possible to obtain an R-θ output that is different from that of square recording pits. Thus, this can also be used to improve the degree of multivalue diversity.

With an optical playback medium of the past, a variety of modulation of the recording pits was applied in the length in the tracking direction, and the case in which there is no modulation of the length of a recording pit in the tracking direction can also be considered to be a type of modulation, and the present invention encompasses such a case as well.

The creation of a magnetic film on a substrate onto which are formed recording pits can be seen, for example, in the Japanese Unexamined Patent Publication (KOKAI)No.2-246031. These techniques are used as a ROM, by detecting the change in amount of reflected light from recording pits, with other areas used as RAM, by performing magneto-optical recording.

A large difference with respect to the present invention is that in the present invention the depression and protrusion recording pits are of two or more types. The magnetic film and the configurations of the recording pits contribute to one another, so that by detecting the changes thereof it is possible to assign multiple values to the recording pits in the case of the present invention.

Thus there is a great difference with respect to the technique of the above-noted Japanese Unexamined Patent Publication (KOKAI)No.2-246031 or the like.

Additionally, a technique such as seen in the Japanese Unexamined Patent Publication (KOKAI)No.4-129046 is also known. In this publication, although both a change in amount of reflected light and a magneto-optical recording action are used, the physical principle and construction thereof are radically different from those of the present invention.

For example, in the above-noted Japanese Unexamined Patent Publication (HOKAI)No.4-129046, recording pits are created, and by changing the direction of magnetization within these recording pits, the manner in which a magneto-optical recording action occurs is changed. In the present invention, however, by using two or more types of shapes for the depressions and protrusions, it is possible to impart to each recording pit a different magneto-optical recording action information.

Thus, the above-noted Japanese Unexamined Patent Publication (KOKAI) No.4-129046, among others, is completely different from the present invention in terms of physical principle and construction. Additionally, although the Japanese Unexamined Patent Publication (KOKAI) No.2-177036 is another multivalue memory, the magnetic body therein does not have a shape, and upon playback, light of a number of different wavelengths must be used, so that it is also different in both physical principle and construction with respect to the present invention. In light of the foregoing, it is clearly seen that the present invention is novel.

Another multivalue system is as follows. If recording pits are formed to the left and to the right of an axis P1 to Pn which are parallel to the tracking direction TR and which passes through the center of tracking (the center of the playback light spot), the amount of reflected light therefrom will be asymmetrical with respect to that axis.

By using a detector that is bifurcated in a parallel manner with respect to that axis and taking the difference in amount of reflected light between the two sides thereof, it is possible to identify whether a recording pit is on the left side or the right side. This means that the multiplicity of the recording pits is doubled, and assignment of multiple values is possible by this means as well.

In this case, on a surface of the optical playback medium, a magnetic film may be formed and further only a light-reflective film may also be formed.

When the light-reflective film is used, the photo-detector is desirably divided into two portions so that the direction to which the peak value of the intensity of the reflected light is deviated can easily be determined.

As can be seen from FIG. 6, when playback is done utilizing the reflected light with a given polarization direction, the R-θ outputs for the lands and the grooves will differ. Therefore, if adjacent recording pits are formed as alternating lands and grooves and playback is done of the respective R-θ outputs with the ideal polarization, the crosstalk between adjacent tracks is reduced.

This means that the track pitch can be made even narrower, thereby enabling an increase in density. Because the output of TM polarized light is large for a land and the output of TE polarized light is large for a groove, playback is done with TM polarized light for a part on which a land-shaped recording pit is formed, and with TE polarized light for a part on which a groove-shaped recording pit is formed.

When playing back the above-noted optical playback medium, it is possible to use all varieties of light, such as TE polarized light, TM polarized light, circularly polarized light, elliptically polarized light, or linearly polarized light that is intermediate between TE polarized light and TM polarized light. There is no restriction in which optical system is used to playback the optical playback medium.

For example, an optical system which uses linearly polarized light can be just the addition of ½-wavelength plate between the objective lens and the polarizing beam splitter closest to the objective lens as seen in a playback optical system for a magneto-optical disk in the past. For the differential output, it is possible to adjust the Wollaston prism or ½-wavelength plate existing in a playback system of the past so that it is easy to discriminate between each of the recording pits. In the case of using either circularly or elliptically polarized light, a PBS (polarization beam splitter) can be placed before the detector of a playback optical system such as in a CD-ROM of past, and the s polarized light and p polarized light can each be detected separately.

When reading out asymmetrically arranged pits, a playback photodetector such as used in the past can be divided. It is possible to achieve both of these. In the case of using an optical system which makes use of a conventional ½-wavelength plate and a polarization beam splitter to divide the s polarized light and p polarized light, respectively, because two photodetectors are generally used, each of them should be split in a direction that is parallel to the tracking direction.

In the case of using an optical system which makes use of a Wollaston prism to divide the s polarized light and p polarized light, because it is generally sufficient to have one photodetector, this can be divided into four parts in a direction that is parallel to the tracking direction.

FIG. 7 shows a playback optical system with respect to the optical playback media of FIG. 1 through FIG. 5, the playback optical system shown being one for the case in which linearly polarized playback light is used. In playback, light passes through the polarization beam splitter 76, the polarization beam splitter 75, the ½-wavelength plate 71, and the objective lens 78, and strikes the optical playback medium 70. This playback optical system, with the exception of the existence of the ½-wavelength plate 71, is the same as an optical system for a magneto-optical disk of the past.

By means of the ½-wavelength plate 71, the incident light polarization is changed. Reflected light that is reflected from the optical playback medium 70 passes through the objective lens 78 and the ½-wavelength plate 71 and strikes the polarization beam splitter 75.

The polarization beam splitter 75 splits this incident light between a first and a second split light. The first split light strikes the polarization beam splitter 76. The polarization beam splitter 76 guides the first split light to a servosystem, at which prescribed processing is performed. The second split light passes via a ½-wavelength plate 77 to strike the polarization beam splitter 74. The polarization beam splitter 74 causes the second split light to strike the double-divided photodetectors 72 and 73.

The two outputs of the double-divided photodetector 73 are taken as A and B, and the two outputs of the double-divided photodetector 72 are taken as C and D, so that a calculation circuit (not shown in the drawing) outputs (A+B)−(C+D), (A+C)−(B+D), and A+B+C+D. (A+B)−(C+D) is used in identifying the recording pit shape (for example identifying as either a groove or land), (A+C)−(B+D) is used in identifying the position in the left-right direction of the recording pit 3 shown in FIG. 4, and A+B+C+D is used in identifying the depression (groove) depth or protrusion (land) height.

The four photodetectors which respectively output A, B, C, and D are deviated as noted in the summary of the invention.

The polarization beam splitter 74 can be Wollaston prism, in which case either two double-divided photodetectors arranged in a row are used, or a quad-divided photodetector which is divided in a direction that is parallel to the direction of relative movement between the optical head and the optical playback medium is used.

Note that in FIG. 7, the optical system is preferably used in playing back information from a optical playback medium 70 on which the center axis of each one of the recording pits as formed on the optical playback medium 70 are arranged so as to be deviated from a center axis of the tracks by a certain distance. However, when these recording pits are arranged on the optical playback medium in a way that the respective center axis of each one of the recording pits coincides with the center of each tracks and the playback is performed from such optical playback medium, the photodetector is not necessarily divided into two sections.

On the other hand, in the present invention, the technical conception in that the playback light to be directed to the playback medium and which has a predetermined polarization direction is further polarized in a predetermined polarization direction immediately before it is radiated at said playback medium, is important.

Therefore, in the present invention, in order to implement this technical conception, a ½-wave length plate 71 is provided in an optical passage formed between a polarization beam splitter 75 and an objective lens 78 which is deviated opposite to the playback medium 70, through said optical passage, a light beam generated from a laser beam source passes.

The optical system shown in FIG. 7 is a basic optical system, and it is possible to make a functional replacement by using a hologram element, for example, to make the optical head compact.

The direction of incidence of light can be either from the substrate or from the film surface side, and the detection of light can be done using either reflected light from the optical playback medium or light transmitted therethrough.

In the case of using circularly polarized light or elliptically polarized light as well, the optical system can be almost the same as shown in FIG. 7, for example, by removing the ½-wavelength plates 71 and 77, replacing the polarization beam splitter 75 with a half-mirror, and using a ¼-wavelength plate between the polarization beam splitters 75 and 76. Basically, a CD-ROM playback system can be used, with a polarization beam splitter 74, and double-divided photodetectors 72 and 73 used as the playback signal detection section.

A more specific example is described below.

In this example, a 120-mm-diameter polycarbonate substrate having an index of refraction of 1.5, is used, onto which is formed a SiN interference film, a TbFeCo magnetic film, a SiN protective film, and an Al alloy reflective film. The optical system used is the same as shown in FIG. 7, the polarization direction of light incident to the optical disk being the three types of parallel to the tracking direction, perpendicular to the tracking direction, and circular. In the case of circularly polarized light, as discussed earlier, the optical system of FIG. 7 is modified slightly for use with circularly polarized light. The incident light wavelength is 680 nm.

First, an experiment was conducted for the case of recording pits formed as shown in FIG. 1. The depth and height of the recording pits was 55 nm. Upon playing back, all the signals (A+B)−(C+D) and A+B+C+D were played back well with any polarization, and signals of the quality as from a CD-ROM in the past were obtained. By doing this, it was verified that an optical playback medium having a density of 1.5 times current CD-ROMs and a playback method therefor were obtained.

Next, an experiment was performed for the case of recording pits formed as shown in FIG. 2. The disk configuration and playback system were the same as in the above-noted example. The depth and height of the recording pits were the two types of 55 nm and 230 nm. Upon playing back, all the signals (A+B)−(C+D) and (A+B+C+D) were played back well with any polarization, and signals of the quality as from a CD-ROM in the past were obtained. By doing this, it was verified that an optical playback medium having a density of 2 times current CDROMs and a playback method therefor were obtained.

Next, an experiment was performed for the case of recording pits formed as shown in FIG. 3. The disk configuration and playback system were the same as in the above-noted example. The depth and height of the recording pits was 55 nm.

Recording pits having a square shape of 1 μm on a side, and a rectangular shape having a long side of 2 μm and a short side of 1 μm were used. Upon playing back, all the signals (A+B)−(C+D) and (A+B+C+D) were played back well with any polarization, and signals of the quality as from a CD-ROM in the past were obtained. By doing this, it was verified that an optical playback medium having a density of 2 times current CD-ROMs and a playback method therefor were obtained.

Next, an experiment was performed for the case of recording pits formed on an optical playback medium in which a light reflecting film is formed on a surface of the substrate, as shown in FIG. 4.

The disk configuration and playback system were the same as in the above-noted example. The depth and height of the recording pits was 55 nm.

Further, in this embodiment, each of the recording pits are arranged on the surface of the optical playback medium in either right hand side area or left hand side area with respect to a center axis of a tracking line so that a center axis of each one of the recording pits is deviated at a place apart from the center axis of a tracking line by ±0.3 m, respectively.

Figure 9:
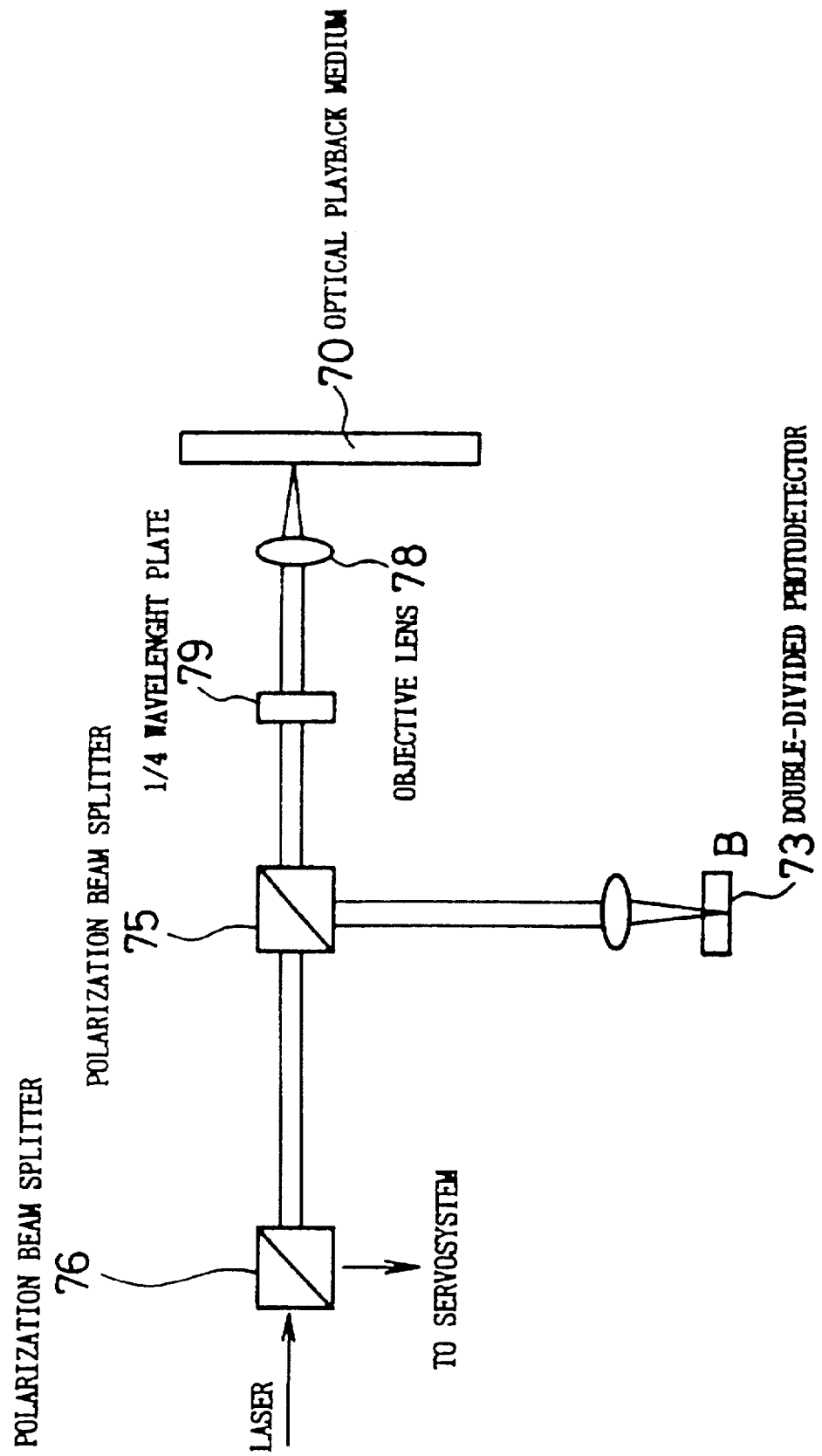
FIG. 9 is a simplified drawing which shows an optical system of the optical playback medium used in the fourth embodiment of the present invention.

In this embodiment, when the playback is carried out to simply detect information about the extent that each center axis of each one of the recording pits is deviated from the center axis of the tracking line, a more simplified optical playback system as shown in FIG. 9 than that as shown in FIG. 7, can be used.

In this system, a ¼-wave length plate 79 is provided in an optical passage formed between a polarization beam splitter 75 and an objective lens 78, instead of the ½-wave length plate 71, and the reflected light reflected from a surface of the optical playback medium 70 is polarized by the polarization beam splitter 75 and thus polarized reflected light is directly input to a photo-detector 73 light receiving section is divided into two portion.

On the other hand, when a optical playback medium 70 provided with a plurality of recording pits each having a length or a height being different from each other, is used, the surface of the substrate is preferably covered with a magnetic film, instead of using a light reflection film, and the playback is performed in the optical playback system as disclosed in FIG. 7.

Upon playing back, all the signals (A+B)−(C+D) (A+C)−(B+D), and (A+B+C+D) were played back well with any polarization, and signals of the quality as from a CD-ROM in the past were obtained. By doing this, it was verified that an optical playback medium having a density of 2 times current CD-ROMs and a playback method therefor were obtained.

Next, an experiment was performed for the case of recording pits formed as shown in FIG. 5. The disk configuration and playback system were the same as in the above-noted example. The depth and height of the recording pits was 55 nm. Upon playing back, the signal A+B+C+D was played back well with any polarization, and additionally there was a 10 dB reduction in crosstalk from adjacent tracks. By doing this, it was verified that a track pitch that has a higher density than current CD-ROMs was obtained.

Next, an experiment was performed with a mixture of recording pits of the above-noted embodiments. Naturally, all pits were played back well, it was verified that an optical playback medium having a density of 4 times current CD-ROMs and a playback method therefor were obtained.

Upon making an optical card having the same specifications as noted above, the same kind of results were obtained, thereby verifying the usefulness thereof.

Instead of forming recording pits that are depressions or protrusions in the substrate surface, it is possible to form recording pits that are depressions or protrusions in the magnetic film surface that is formed on the substrate surface. According to the present invention as described in detail above, without making hardly any changes in the current manufacturing technology, drive, and head, it is possible to make an optical playback medium having a recording density that is a number of times that of current CD-ROMs, enabling the achievement of high storage capacity in a optical playback medium, and particularly in an optical disk and optical card.

What is claimed is:

1. An optical playback medium comprising:
   a substrate having a substrate surface;
   a magnetic film formed onto said surface of said substrate and having a magnetic film surface; and
   a plurality of recording pits formed on one of said substrate surface and said magnetic film surface, each said recording pit having a length component along a tracking direction of said optical playback medium, a width component that is perpendicular to said tracking direction, and a height component that is in a direction perpendicular to said substrate surface, wherein at least one of said plurality of recording pits has a configuration different from that of the rest of said plurality of recording pits with respect to said height component and at least one of said width component and said length component.

2. An optical playback medium according to claim 1, wherein at least one of said plurality of recording pits have configurations different from that of the rest of said plurality of recording pits with respect to said width component.

3. An optical playback medium according to claim 1, wherein at least one of said plurality of recording pits have configurations different from that of the rest of said plurality of recording pits with respect to said length component.

4. An optical playback medium according to claim 1, wherein each one of said plurality of recording pits has a respective height component of said configurations in said recording pits, a direction of which being one of a direction directing from said surface of said substrate to an inside area of said substrate and a direction directing from said surface of said substrate to an external area out of said substrate, with respect to one of said surface of said substrate and said magnetic film, as a reference surface.

5. An optical playback medium according to claim 4, wherein a plurality of recording pits each having a configuration in that said height component thereof is different from each other, are mixedly formed on said surface of said substrate.

6. An optical playback medium according to claim 5, wherein said plurality of recording pits mixedly include depressed recording pits and protrudent recording pits.

7. An optical playback medium according to claim 6, wherein a depth of at least one of said depressed recording pits in a group of said depressed recording pits or a height of at least one of said protrudent recording pits in a group of said protrudent recording pits is different from a depth of the rest of said depressed recording pits in a group of said depressed recording pits or a height of the rest of said protrudent recording pits in a group of said protrudent recording pits.

8. An optical playback medium according to claim 6, wherein at least one of said recording pits belonging to at least one of the group selected from a group consisting of a plurality of said depressed recording pits and a group consisting of a plurality of said protrudent recording pits, have a pit-configuration in which at least one of said length component parallel to said tracking direction and said width component perpendicular to said tracking direction is different from the same component of said configurations of recording pits other than said one of said recording pits.

9. An optical playback medium comprising:
   a substrate having a substrate surface;
   a magnetic film formed onto said surface of said substrate and having a magnetic film surface; and
   a plurality of recording pits formed on one of said substrate surface and said magnetic film surface, each said recording pit having a length component along a tracking direction of said optical playback medium, a width component that is perpendicular to said tracking direction, and a height component that is in a direction perpendicular to said substrate surface, wherein at least one of said plurality of recording pits has a configuration different from that of the rest of said plurality of recording pits with respect to said height component,
   wherein each one of said plurality of recording pits has a respective height component of said configurations in said recording pits, a direction of which being one of a direction directing from said surface of said substrate to an inside area of said substrate and a direction directing from said surface of said substrate to an external area out of said substrate, with respect to one of said surface of said substrate and said magnetic film, as a reference surface,
   wherein a plurality of recording pits each having a configuration in that said height component thereof is different from each other, are mixedly formed on said surface of said substrate,
   wherein said plurality of recording pits mixedly include depressed recording pits and protrudent recording pits,
   wherein a depth of at least one of said depressed recording pits in a group of said depressed recording pits or a height of at least one of said protrudent recording pits in a group of said protrudent recording pits is different from a depth of the rest of said depressed recording pits in said group of said depressed recording pits or a height of the rest of said protrudent recording pits in said group of said protrudent recording pits, and
   wherein when an index of reflection of said substrate is set at n, said depth or height of each one of said recording pits is set up at from 1/(8n) to 1/(4n) of the wavelength of playback light used in playback from said optical playback medium or set up at a value obtained by adding the value representing from 1/(8n) to 1/(4n) of the wavelength of playback light to an integer number times wavelength of playback light.

10. An optical playback medium according to claim 9, wherein said playback medium further comprises additional recording pits depth or height of which are set up at from 1/(10n) to 1/(30n) of the wavelength of playback light used in playback from said optical playback medium or set up at a value obtained by multiplying the value of 1/(4n) of the wavelength of playback light by the integer number.

11. An optical playback medium according to claim 1, wherein said recording pits are formed on one of said substrate surface and said magnetic film surface by protrusions and depressions which have a rectangular shape with a long side in the tracking direction, protrusions and depressions which have a square shape, or protrusions and depressions having rectangular and square shapes.

12. An optical playback medium according to claim 11, wherein said recording pits are formed on one of said substrate surface or said magnetic film surface by at least one of protrusions or depressions selected from a group of the protrusions or depressions comprising the protrusions or depressions having a rectangular shape with a long side in the tracking direction, protrusions or depressions having a rectangular shape with a long side perpendicular to the tracking direction and protrusions or depressions having a square shape.

13. An optical playback medium comprising:
   a substrate having a substrate surface;
   a magnetic film formed onto said surface of said substrate and having a magnetic film surface; and
   a plurality of recording pits formed on one of said substrate surface and said magnetic film surface, each said recording pit having a length component along a tracking direction of said optical playback medium, a width component that is perpendicular to said tracking direction, and a height component that is perpendicular to said substrate surface, at least one of said plurality of recording pits has a configuration different from that of the rest of said plurality of recording pits with respect to said height component and at least one of said width component and said length component, and wherein at least one of said plurality of recording pits being disposed to the left or the right side, as a border, of an axis which is parallel to the tracking direction of said optical playback medium and which passes through the center of tracking of said optical playback medium.

14. An optical playback medium according to claim 13, wherein configurations of each one of said recording pits are constructed so that at least one of said length component, said width component and said height component of at least one of said recording pits is different from that of the rest of said recording pits.

15. An optical playback medium according to claim 1, wherein directions of said height component of recording pits which are adjacently arranged to each other in a direction that is perpendicular to the tracking direction of said optical playback medium are mutually opposite.

16. An optical playback medium according to claim 13, wherein directions of said height component of recording pits which are adjacently arranged to each other in a direction that is perpendicular to the tracking direction of said optical playback medium are mutually opposite.

17. An optical playback medium comprising:
   a substrate having a substrate surface;
   a light-reflective film formed onto said surface of said substrate and having a light-reflective film surface; and
   a plurality of recording pits formed on one of said substrate surface and said light-reflective film surface, each said recording pit having a length component along a tracking direction of said optical playback medium, a width component that is perpendicular to said tracking direction, and a height component that is perpendicular to said substrate surface, at least one of said plurality of recording pits has a configuration different from that of the rest of said plurality of recording pits with respect to said height component and at least one of said width component and said length component, and wherein at least one of said plurality of recording pits being disposed to the left or the right side, as a border, of an axis which is parallel to the tracking direction of said optical playback medium and which passes through the center of tracking of said optical playback medium.

18. An optical playback medium playback method comprising the steps of:

preparing an optical playback medium comprising, a substrate which has a substrate surface, a magnetic film which is formed onto said surface of said substrate and which has a magnetic film surface, and a plurality of recording pits which are formed on one of said substrate surface and said magnetic film surface, each said recording pit having a length component along a tracking direction of said optical playback medium, a width component that is perpendicular to said tracking direction, and a height component that is perpendicular to said substrate surface, at least one of said plurality of recording pits has a configuration different from that of the rest of said plurality of recording pits with respect to said height component and at least one of said width component and said length component; and directing light having at least one polarization direction which is selected from a light having a polarization direction that is parallel to the tracking direction of said optical playback medium and a light having a polarization direction that is perpendicular to the tracking direction of said optical playback medium, to said playback medium so as to playback information as stored in said playback medium.

19. An optical playback medium playback method according to claim 18, wherein when said playback operation is carried out, light which is circularly polarized or elliptically polarized is used to perform playback.

20. An optical playback medium playback method according to claim 18, wherein said light to be directed to said playback medium and having a predetermined polarization direction is further polarized in a predetermined polarization direction immediately before it is radiated at said playback medium.

21. An optical playback medium playback method according to claim 20, wherein said a ½-wave length plate is provided in an optical passage formed between a polarization beam splitter and an objective lens which is disposed opposite to said playback medium, through said optical passage, a light beam generated from a laser beam source passes.

22. An optical playback medium playback method according to claim 18, wherein, seen from the playback light incidence side, with respect to a recording pit that is a depression with respect to said substrate surface or said magnetic film surface, playback is performed with light having a polarization direction that is perpendicular to the tracking direction, and with respect to a recording pit that is a protrusion with respect to said substrate surface or said magnetic film surface, playback is performed with light having a polarization direction that is parallel to the tracking direction.

23. An optical playback medium playback method according to claim 18, wherein, playback is performed using a photodetector which detects said playback light reflected from said optical playback medium and which is divided into at least two parts, along a direction that is parallel to the tracking direction of said optical playback medium.

24. An optical playback medium playback method according to claim 23, wherein playback is performed by taking the difference of the sum of the output on one side of an axis parallel to the tracking direction, the sum of the output on the side other than the one side, and the sum of these two sides.

25. An optical playback medium playback method according to claim 23, wherein said method makes use of an optical system which divides light from said optical playback medium immediately before striking a photodetector into a polarization direction that is parallel to the tracking direction (TE polarization) and a polarization that is perpendicular to the tracking direction (TM polarization), wherein a photodetector that detects each component is divided into two by an axis that is parallel to the tracking direction and passes through the center thereof, an output on the center side of the optical playback medium with respect to said axis of the detector that detects said TE polarized light being A, an output on the opposite side thereof being B, an output on the center side of the optical playback medium with respect to said axis of the detector that detects said TM polarized light being C, and an output on the opposite side thereof being D, and wherein A, B, C, and D are used to generate playback signals.

26. An optical playback medium playback method according to claim 22, wherein, the directions of polarization of light of said recording pits which are adjacent in a direction that is perpendicular to the tracking direction of said optical playback medium are mutually perpendicular.

27. An optical playback medium according to claim 6 wherein said protrudent recording pits have a particular height with respect to a plane perpendicular to a tracking direction of the optical playback medium, and wherein said depressed recording pits have a particular depth with respect to the plane perpendicular to the tracking direction of the optical playback medium.

28. An optical playback medium comprising:

a substrate having a substrate surface;

a magnetic film formed onto said surface of said substrate and having a magnetic film surface; and a plurality of recording pits formed on one of said substrate surface and said magnetic film surface, each said recording pit having a length component along a tracking direction of said optical playback medium, a width component that is perpendicular to said tracking direction, and a height component that is in a direction perpendicular to said substrate surface, wherein at least one of said plurality of recording pits has a configuration different from that of the rest of said plurality of recording pits with respect to said height component, wherein said plurality of recording pits include at least one depressed recording pit and at least one protrudent recording pit.

\* \* \* \* \*